Patented Sept. 27, 1932

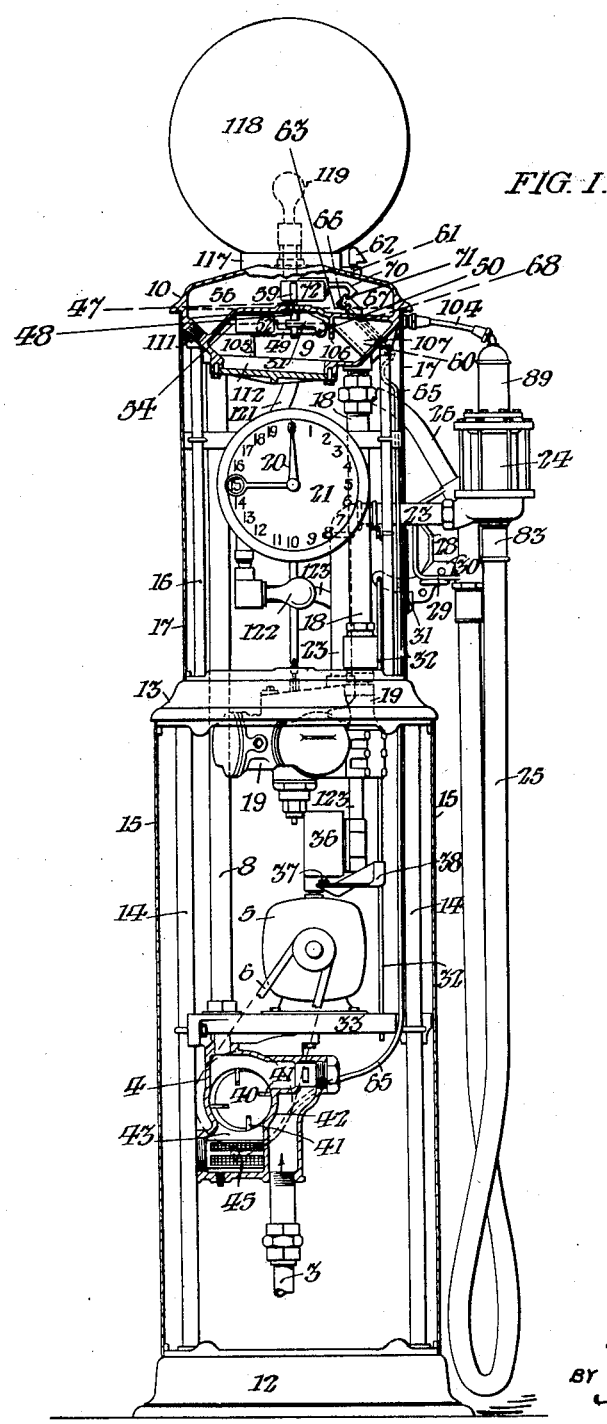

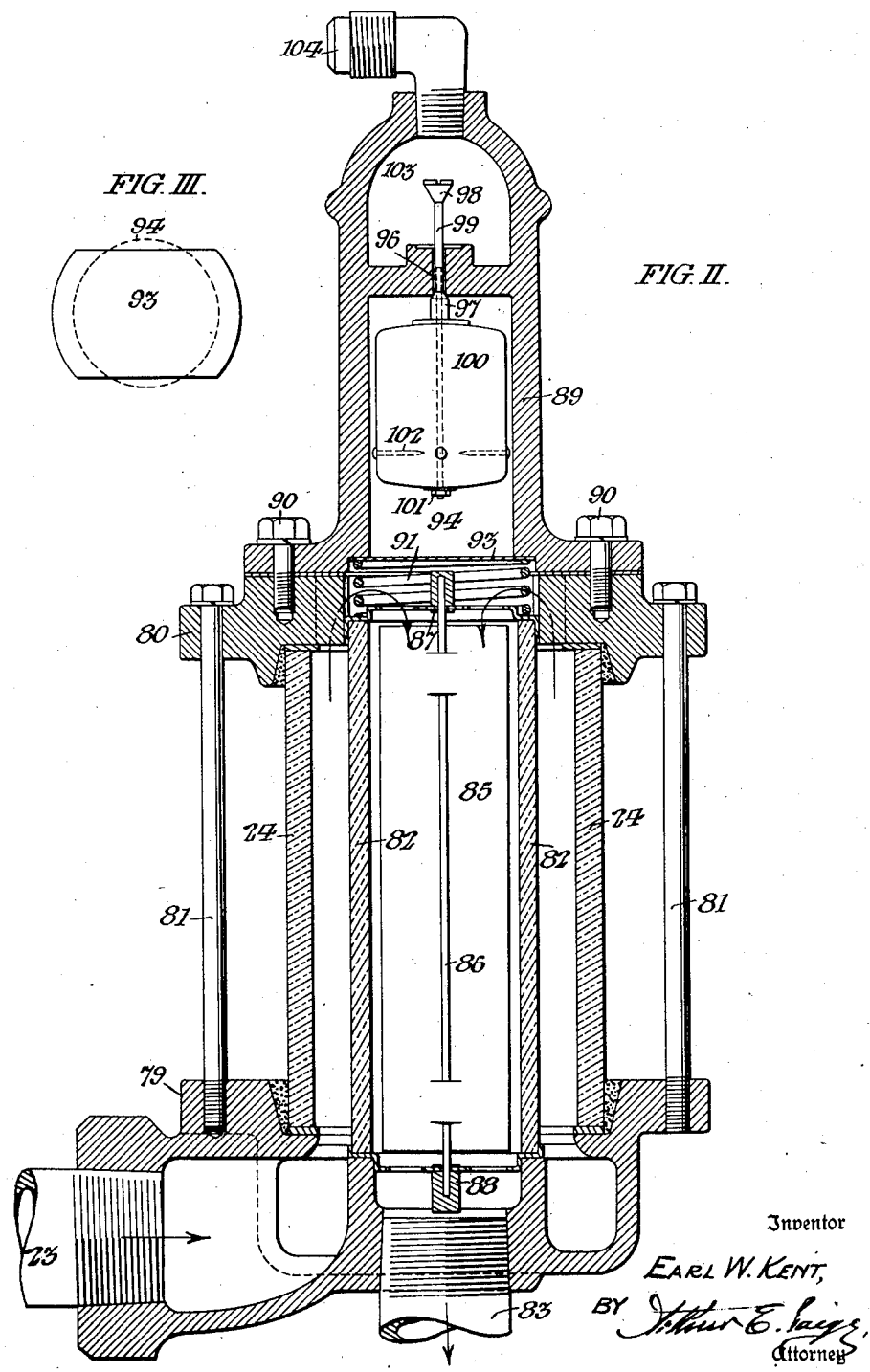

1,879,309

UNITED STATES PATENT OFFICE

EARL W. KENT, OF MUSKEGON, MICHIGAN, ASSIGNOR TO SERVICE STATION EQUIPMENT COMPANY, OF CONSHOHOCKEN, PENNSYLVANIA, A CORPORATION OF DELAWARE

LIQUID DISPENSING APPARATUS

Application filed December 4, 1931. Serial No. 578,882.

My invention may be advantageously employed in apparatus for dispensing gasolene by means of a pump which extracts the liquid from a subjacent tank and delivers it under pressure through a flow meter and dispensing hose. Said meter includes a rotatable index pointer adapted to traverse a circular series of graduations on a dial to indicate gallons and fractions thereof dispensed, and said pointer is turned by the flow of fluid through said meter. In some localities the law requires the inclusion of a transparent container between the pump and the hose through which the liquid must pass and in which the purchaser may observe whether or not liquid is being delivered to the hose. If there is a leak in the suction line from the subjacent tank to the pump, air is drawn into the liquid conduit and is manifested by bubbles in the liquid passing through the container and, under some circumstances, bubbles of vapor of the liquid being dispensed may similarly appear. Of course, the passage of air or other gas through the metering pump, in lieu of liquid, renders the manifestation of the amount dispensed erroneous. Therefore, the principal purpose and effect of my invention is to insure the delivery of liquid without the inclusion of bubbles of air or vapor and to the full amount indicated by the meter.

As hereinafter described, the essential feature of my invention is that means are provided for separating the liquid from any lighter fluid, such as air or vapor of the liquid, on its way from the subjacent tank to the meter and to insure that only liquid shall be delivered thereto and dispensed therethrough. Such means includes what I hereinafter term a gas trap in the liquid dispensing conduit located at the top of the transparent container having a gas vent leading to the atmosphere. Said vent is preferably through a conduit leading to a hollow dome at the top of the casing inclosing said pump and meter and their appurtenances, through which dome the liquid passes on its way from the pump to the meter and which dome has an opening at its top leading to the atmosphere; so that gas eliminated from the top of said transparent container may be replaced by liquid from said dome. However, the general combination including a pump stand with a hollow dome at the top of its casing, through which liquid is delivered from the pump to the meter, is the subject matter of my copending application Serial No. 578,881 filed December 4, 1931, for Letters Patent of the United States, and my present invention is not limited to that combination but relates more particularly to the construction and arrangement of the gas eliminator features of the transparent container.

My invention includes the various novel features of construction and arrangement hereinafter more definitely specified.

In said drawings; Fig. I is a partly sectional elevation of liquid dispensing apparatus of the type known as a curb stand, embodying my invention.

Fig. II is a vertical sectional view of the transparent container and its appurtenances shown in Fig. I, but on a larger scale.

Fig. III is a plan view of the baffle plate shown in section in Fig. II.

In said figures; the liquid to be dispensed is stored in an underground tank from which it is withdrawn through the conduit 3 by and to the pump 4 which is conveniently electrically operated by the motor 5 connected therewith by the belt 6. Said pump 4 discharges the liquid through the conduit 8 into the chamber 9 in the trap casing 10 which forms a substantially rectangular dome at the top of the curb stand. Said curb stand includes the substantially rectangular base 12 and center frame 13 connected by the vertical standards 14, surrounded by the removable sheet metal casing 15. Said center frame 13 is connected with said dome 10 by the standards 16, surrounded by the removable sheet metal casing 17.

Said chamber 9 in the trap casing 10 is connected by the conduit 18 with the flow meter 19 which includes mechanism for turning the indicator 20 with respect to graduations on the circular dial 21, to indicate the volume of fluid dispensed through said flow meter from the conduit 18 to the conduit 23. Said conduit 23 leads into the sight gage 24 which is a vessel having a transparent wall through which the quantity of liquid therein may be observed by the purchaser. When the apparatus is working properly, said sight gage 24 is continually filled with liquid which is, however, dispensable therefrom through the flexible hose 25 and nozzle 26 under control of a nozzle valve operable by the lever handle 28 within the handle guard 29 on said nozzle.

As indicated in Fig. I; said nozzle 26 is supported upon the lever 30 which is fulcrumed at 31 in connection with said curb stand and carries at its inner end the rod 32 which is mounted to reciprocate through the platform 33 which is fixed in said stand in connection with the standards 14, and supports the pump 4 and motor 5, as shown. Said rod 32 is arranged to operate an electric switch in the casing 36 provided with the push button 37 projecting downwardly from said casing in cooperative relation with the bracket 38 fixed on said rod 32.

Said pump 4 is conveniently of the type including a rotor 40 having a circular series of spring pressed blades 41, which turn in contact with the cylindrical surface in the casing 42. Said casing 42 incloses the screen chamber 43 containing the removable screen 45 through which the liquid passes from the conduit 3 to the conduit 8.

The construction and arrangement above described are such that all of the fluid lifted by said pump 4, and including liquid, air, and other gaseous vapor, is compelled to pass through said trap chamber 9, and the lighter fluids, of course, separate from the liquid in said chamber.

In order to eliminate the gaseous fluids from said chamber 9, I provide the port 47 in the top of said chamber through which such lighter fluids may escape, under control of a float valve 48 which is pivotally connected with the valve lever 49 fulcrumed at 50 in the stationary bracket 51 in said chamber. Said lever 49 carries at its free end the float 52 by which said lever and the valve 48 are uplifted to close said port 47 whenever the liquid in said chamber reaches a predetermined level, indicated by the dash line 54.

The air and other gaseous fluids separated from the liquid in said trap casing 10 escape from the latter through the vent port 61 in the top of said dome 10, which is provided with the cowl 62 permitting the escape of said fluids without ingress of rain or snow.

When the liquid, in said chamber 56, accumulates above the level indicated by the dash line 63, it is drained therefrom back to the suction side of said pump 4 through the conduit 65 shown in Fig. I, under control of the valve 66 which is mounted to reciprocate in the valve casing 67 in registry with the port 68 leading to said conduit 65. Said valve 66 is operatively connected with the lever 70 which is fulcrumed at 71 in said casing 67 and carries at its free end the float 72.

It may be observed that the location of said drain port 68 is such that it is always submerged by liquid in said drain pocket 60, so that it is impossible for the pump to suck air or other gaseous fluid from said chamber 56 when said valve 66 is opened by the rise of liquid in said dome chamber 56.

The apparatus above described is effective to eliminate air and other fluids lighter than the liquid dispensed, from such liquid on its way to the sight gage 24, but, as above contemplated, when said sight gage is exposed to the heat of the sun, in some climates, vapor may be generated from the gasolene therein, and, therefore, I prefer to provide means to vent such vapor from said gage and to maintain the latter always full of liquid by establishing communication between the top of said gage and the chamber 56 in said dome 10. Such means are best shown in Fig. II, wherein the transparent container 24 is a cylinder of glass mounted between the base fitting 79 which is supported by the conduit 23, and the cap fitting 80 which is detachably rigidly connected with said base fitting 79 by the circular series of bolts 81. The liquid passes upwardly from said conduit 23 between said container 24 and the inner glass cylinder 82, over the top of said cylinder 82 and down the latter to the rigid conduit 83 which carries the flexible hose 25. The sheet metal vane 85 is rigidly connected with its axial shaft 86 which is journaled in bearings 87 and 88 respectively at the top and bottom of said cylinder 82; so that said vane is rotated by the swirling movement of the liquid downwardly through said cylinder 82 to visually manifest the movement of said liquid into the dispensing hose.

I superimpose upon said cap fitting 80 an opaque float valve casing 89, conveniently detachably rigidly connected therewith by the cap screws 90, and arrange said casing 89 to receive and vent to the atmosphere any gaseous fluid which may arise from the liquid in said transparent container. Said vane 85 and its bearings 87 and 88 are conveniently removably held in the assembled relation shown in Fig. II by the spring 91 which is compressed between the circular plate member of said bearing 87 and the bottom of said valve casing 89, and said spring holds in place, against the bottom of said casing 89, the baffle plate 93 which, as shown in Fig. III, is slightly narrower than the cylindrical float valve chamber 94 in said valve casing 89; so that although said plate 93 baffles the flow of liquid into said valve chamber 94, it permits the escape into said chamber 94 of any gaseous fluid arising from the liquid in said transparent container. Such fluid is vented through the valve port 96 in said casing 89, under control of the two, spaced, valve members 97 and 98 which are rigidly connected with the valve stem 99, which stem is rigidly connected with the float 100, conveniently by the nut 101. Gas is eliminated only when said valve is in its intermediate position. Said float is preferably cylindrical and formed of cork having round headed nails 102 set therein so as to maintain it in substantially concentric spaced relation in said chamber 94.

The construction and arrangement above described are such that the operation of the pump 4 not only fills the container 24 but also normally fills the valve chamber 94 with the liquid to be dispensed and, when said chamber 94 is substantially filled with liquid, it lifts said float 100 to close said port 96 by the valve 97. However, if and when any fluid lighter than the liquid rises into the top of said chamber 94; the level of the liquid in said chamber is thereby lowered and the float 100 sinks carrying said valve 97 away from said port 96 and opening the latter, thus permitting the lighter fluid to escape through said port 96 and the chamber 103 in said casing 89 and through the conduit 104. Said conduit preferably extends from the top of said valve casing 89 in communication with the chamber 56 in said dome, as indicated in Fig. I; so that the gaseous fluid thus escaping from said float chamber 89 passes through said dome chamber 56 and escapes to the atmosphere through said vent port 61 and cowl 62.

While said valve 97 is thus opened, the liquid trapped in said dome chamber 56 is free to gravitate into the float valve chamber 94 at the top of the sight gage, through said gas vent port 96 until said port is closed by either of said valves 97 or 98 carried by said float 100; the purpose and effect of said float valves 97 and 98 and their appurtenances being to not only eliminate any vapor from the liquid which may accumulate in the valve casing 89, but to replace said vapor with liquid from the dome chamber 56 and thus insure that the purchaser receives the full amount of liquid indicated by the meter at each dispensing operation.

The essential feature of my invention is the provision of a gas trap in the top of a sight gage arranged to eliminate air and other gaseous fluid from the liquid dispensed through said gage.

Therefore, I do not desire to limit myself to the specific details of construction and arrangement herein set forth, as it is obvious that various modifications may be made therein without departing from the essential features of my invention, as defined in the appended claims.

I claim:

1. In liquid dispensing apparatus; the combination with a hollow pump stand comprising a hollow dome at the top thereof, having a gas vent to the atmosphere; of a liquid meter inclosed by said stand; a pump inclosed by said stand, having an intake conduit for connection with a subjacent liquid supply tank and a discharge conduit for conducting liquid from said pump through said meter; a liquid dispensing conduit from said meter; and a transparent liquid container included in said liquid dispensing conduit and having a gas chamber at the top thereof in communication with the interior of said hollow dome; whereby gas may be eliminated from said transparent container through said dome.

2. Apparatus as in claim 1; including a float valve for controlling the escape of gas from said transparent container to said dome, in accordance with the level of liquid in said container.

3. Apparatus as in claim 1; including a float valve for controlling the escape of gas from said transparent container to said dome in accordance with the level of liquid in said container; said valve including two members, in spaced relation, respectively for closing the gas vent from said gas chamber upon upward movement of said float and upon downward movement of said float; whereby gas is eliminated from said chamber only when said valve is in its intermediate position.

4. In liquid dispensing apparatus; the combination with a hollow pump stand; of a pump inclosed by said stand, having a liquid intake conduit; a liquid dispensing conduit extending from said pump exterior to said stand; and a transparent liquid container included in said liquid dispensing conduit and having a gas chamber at the top thereof with a vent to the atmosphere; whereby gas may be eliminated from said transparent container through said vent.

5. Apparatus as in claim 4, including a float valve for controlling the escape of gas from said transparent container to the atmosphere in accordance with the level of liquid in said container.

6. Apparatus as in claim 4, including a float valve for controlling the escape of gas from said transparent container to said dome in accordance with the level of liquid in said container; said valve including two members, in spaced relation, respectively for closing the gas vent from said gas chamber upon upward movement of said float and upon downward movement of said float; whereby gas is eliminated from said chamber only when said valve is in its intermediate position.

7. Apparatus as in claim 4, including an opaque casing inclosing said gas chamber and detachably connected with said transparent container.

8. Apparatus as in claim 4, including an opaque casing inclosing said gas chamber and detachably connected with said transparent container; and a baffle plate between said transparent container and opaque casing; said opaque casing including a cylindrical float chamber opening at the bottom thereof in communication with said transparent container, past said baffle plate; a float mounted to reciprocate in said float chamber, in coaxial relation therewith; and a valve carried by said float controlling the escape of gas from said gas chamber in accordance with the level of liquid at the top of said transparent container.

9. Apparatus as in claim 4, including an opaque casing inclosing said gas chamber and detachably connected with said transparent container; and a baffle plate between said transparent container and opaque casing; said opaque casing including a cylindrical float chamber opening at the bottom thereof in communication with said transparent container, past said baffle plate; a float mounted to reciprocate in said float chamber, in coaxial relation therewith; and a valve carried by said float controlling the escape of gas from said gas chamber in accordance with the level of liquid at the top of said transparent container; said valve comprising two members, in spaced relation, respectively for closing the gas vent from said gas chamber upon upward movement of said float and upon downward movement of said float; whereby gas is eliminated from said chamber only when said valve is in its intermediate position.

10. In liquid dispensing apparatus; the combination with a hollow pump stand; of a pump inclosed by said stand, having a liquid intake conduit; a liquid dispensing conduit extending from said pump exterior to said stand; a transparent liquid container included in said liquid dispensing conduit; an opaque casing at the top of said transparent container including a gas chamber in communication with said transparent container; and valve means in said opaque casing controlling communication between said transparent container and the outer atmosphere, in accordance with the level of liquid at the top of said transparent container.

11. In liquid dispensing apparatus; the combination with a hollow pump stand; of a pump inclosed by said stand, having a liquid intake conduit; a liquid dispensing conduit extending from said pump exterior to said stand; a transparent liquid container included in said liquid dispensing conduit; an opaque casing at the top of said transparent container including a gas chamber in communication with said transparent container; and valve means in said opaque casing controlling communication between said transparent container and the outer atmosphere, in accordance with the level of liquid at the top of said transparent container; said valve means including a float mounted to reciprocate in said opaque casing; a double valve carried by said float, extending through a gas vent port in said opaque casing and having two members, in spaced relation, respectively adapted to close said port when said float is raised and when it is lowered to a predetermined extent by the rise and fall of liquid at the top of said transparent container.

12. In liquid dispensing apparatus; the combination with a conduit including a transparent liquid container; of a liquid reservoir above the level of said container having a vent to the atmosphere; conduit means connecting said container with said reservoir, for conveying gaseous fluid from said container to said reservoir, to escape to the atmosphere, and for conveying liquid by gravity from said reservoir to said container to replace the escaped fluid; and means for supplying said container and reservoir with liquid to be dispensed through said container, comprising a single pump and conduits leading therefrom to said reservoir and container; whereby said container is automatically maintained charged with liquid to a predetermined level, without the attention of the operator.

13. Apparatus as in claim 12; wherein the conduit means connecting said reservoir and transparent container are controlled by a valve, and a float for automatically operating said valve, in accordance with the level of liquid.

14. Apparatus as in claim 12; wherein the conduit means connecting said reservoir and transparent container are controlled by two float valves, respectively operable in accordance with predetermined levels of liquid in said container and in said reservoir.

In testimony whereof, I have hereunto signed my name at Muskegon, Michigan, this thirtieth day of November, 1931.

EARL W. KENT.